United States Patent [19]

Peterson

[11] 4,177,469
[45] Dec. 4, 1979

[54] RECORDER WITH ELECTRICALLY CONDUCTIVE PAPER

[75] Inventor: Dean M. Peterson, Littleton, Colo.

[73] Assignee: Honeywell Inc., Minneapolis, Minn.

[21] Appl. No.: 858,785

[22] Filed: Dec. 8, 1977

[51] Int. Cl.² .................. G01D 9/42; G01D 15/24
[52] U.S. Cl. .............................. 346/110 R; 346/136
[58] Field of Search ...................... 346/110 R, 136; 219/216

[56] References Cited

U.S. PATENT DOCUMENTS

| | | | |
|---|---|---|---|
| 3,346,867 | 10/1967 | Schwarzer | 346/110 R X |
| 3,740,758 | 6/1973 | Fabianic et al. | 346/110 R X |
| 3,754,280 | 8/1973 | Lowe | 346/110 R |
| 3,887,787 | 6/1975 | Gregg | 219/216 |
| 4,038,668 | 7/1977 | Quarton | 346/110 R X |

*Primary Examiner*—George H. Miller, Jr.

*Attorney, Agent, or Firm*—Laurence J. Marhoefer; Lockwood D. Burton; Mitchell J. Halista

[57] ABSTRACT

A recorder using a carbon backed "self-developing" dry silver recording medium which is guided over a recording and developing path includes a pair of rollers one of which is connected to a ground potential and the other to a positive potential with the electrically conducting carbon coated side of the recording medium arranged to contact both of the rollers to enable electrical current to pass through the carbon backing to generate the heat required to develop the recording thereon. A third roller is arranged to contact the recording medium on the recording side and to press the carbon coated side against a second location on the ground roller to provide a second current conducting path between the positive potential roller and the ground roller. The electrical current is controlled in accordance with the speed of the recording medium to insure a proper developing time relationship at different recording medium speeds.

9 Claims, 1 Drawing Figure

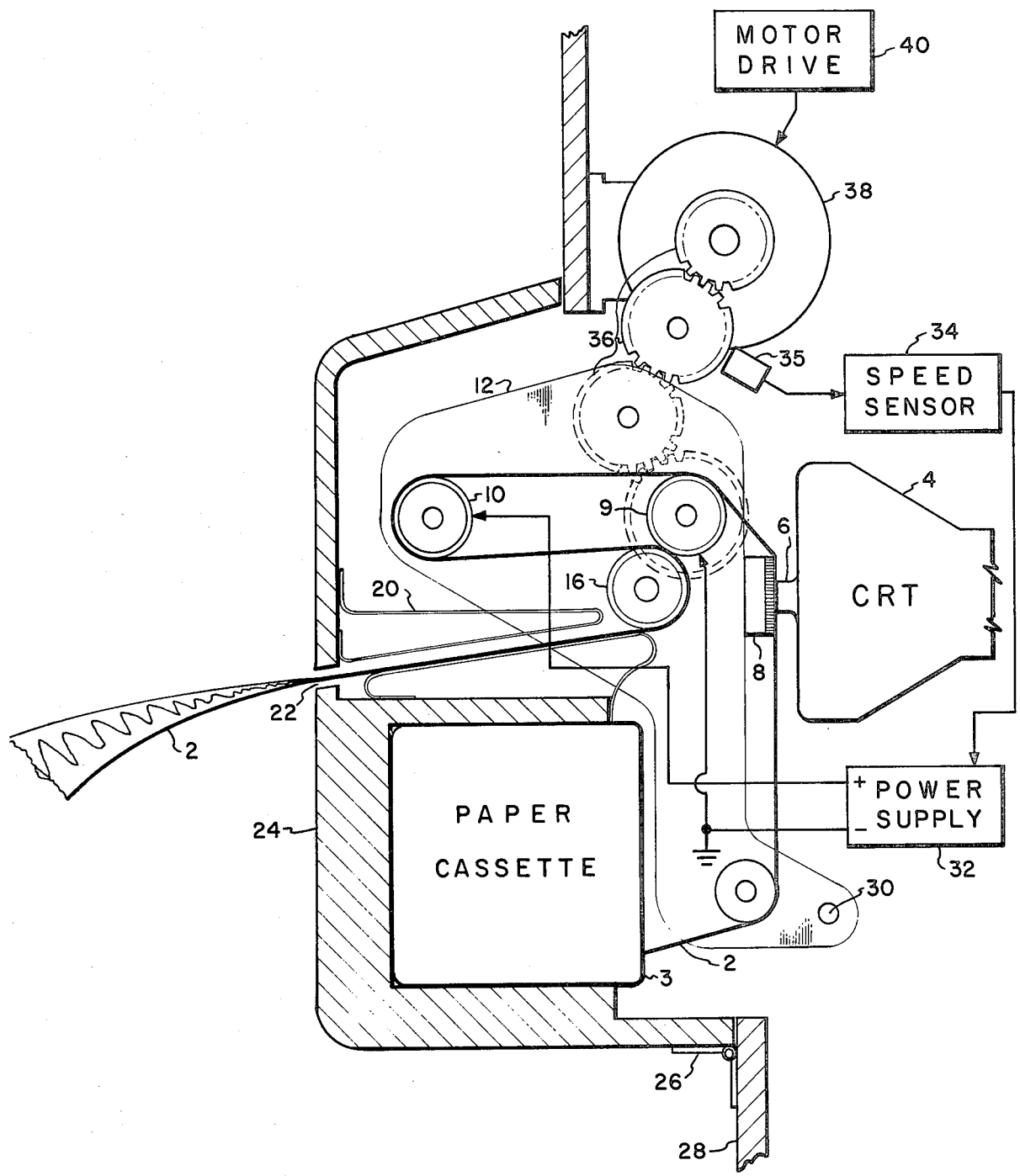

RECORDER WITH ELECTRICALLY CONDUCTIVE PAPER

CROSS-REFERENCE TO CO-PENDING APPLICATION

Subject matter shown but not claimed herein is shown and claimed in a co-pending application of Dean M. Peterson, Ser. No. 833,309, filed on Sept. 13, 1977 and assigned to the same assignee as the present application.

BACKGROUND OF THE INVENTION

Field of the Invention

The present invention relates to recorders. More specifically, the present invention is directed to a recorder for a conductive-backed, heat developed recording media.

SUMMARY OF THE INVENTION

An object of the present invention is to provide an improved recorder using a conductive-backed, heat developed dry silver recording medium.

In accomplishing this and other objects, there has been provided, in accordance with the present invention, a recorder using a pair of rollers for supporting a conductive-backed recording medium on the conductive coated side with one roller being at a ground potential while the other roller is at a positive potential to produce a current flow through the conductive-backing of the recording media. A third roller is arranged to urge the conductive-backing of the recording media into contact with a surface location on the ground potential roller different from that first contacted by the recording medium passing across the ground potential roller. A recording means is arranged to record on the recording medium prior to its passage over the first roller while a recording medium drive means is arranged to drive the recording medium past the means for recording and over the first, second, and third rollers.

BRIEF DESCRIPTION OF THE DRAWING

A better understanding of the present invention may be had when the following detailed description is read in connection with the accompanying drawing in which the single FIGURE is a pictorial diagram of a recorder embodying the present invention.

DETAILED DESCRIPTION

Referring to the single FIGURE drawing in more detail, there is shown a recorder embodying the present invention for recording on a recording medium 2 of the so-called dry silver type having a recording face, or surface, and an electrically conductive-backing. The recording medium 2 may be of the type manufactured by the 3M Company, Minneapolis, Minnesota and identified as Dry Silver Recording Paper using a carbon backing.

The recording medium 2 is withdrawn from a paper cassette 3 used to store the recording paper prior to recording and is positioned in contact with a display face of a recording CRT 4 having a plurality of fiber optic elements 6 extending from the display face thereof. A pressure pad 8 is arranged to urge the recording medium 2 against the fiber optic elements 6. The fiber optic elements 6 extend across the recording medium and are used to transmit the radiation generated by the excitation of the phosphers in the CRT faceplate to the recording medium 2 to produce a recording thereon.

After leaving the pressure plate 8, the recording medium 2 is guided over an electrically conductive drive roller 9 which is connected to a source of the ground, or negative potential to drive means, as hereinafter described. Subsequently, the recording medium 2 is directed around a second electrically conductive roller 10, which is connected to a source of positive potential. The rollers 9 and 10 are rotatably mounted on an electrically insulating support 12. After leaving the second, or turnaround, roller 10, the recording medium 2 is directed back toward the first roller 9 and is held against the opposite side of the roller 9 from the aforesaid initial contact therewith by a pinch roller 16. The rollers 9 and 10 are arranged to contact the conductive, or carbon, backing of the recording medium with the drive roller 9 contacting the recording medium carbon backing before and after its contact with the roller 10.

After leaving the area of second contact between the roller 9 and the pinch roller 16, the recording medium 2 is disposed in the paper guide chute 20. The chute 20 guides the recording medium 2 to an exit slit 22 of a housing 24 surrounding the paper cassette 3 and the aforesaid guide rollers 9, 10 and 16. The cover 24 is arranged to be hinged by a hinge 26 to the recording apparatus structure 28 to allow the cover 24 to be moved to a position whereby the paper cassette 3 may be replaced and the recording medium 2 redisposed on the aforesaid rollers. The cover 24 may be latched in its closed position to the recorder structure 28 by any suitable means (not shown). Further, the insulating support 12 is arranged to be hinged, or pivoted, at a pivot point 30 to allow the rollers 9 and 10 and the pressure plate 8 to be moved away from the pinch roller 16 and the fiber optic elements 6 to enable a new supply of the recording medium 2 to be disposed in the recording apparatus.

The drive roller 9 is connected through a gear train 36 to a drive motor 38 which is driven by a motor drive apparatus 40. The motor drive apparatus 40 may be any suitable motor drive circuit capable of driving the motor 38 at a preselected speed, such devices being well-known in the art. The speed of the gear train 36 is sensed by a speed sensor 34 having a sensing element 35 arranged to be adjacent to one of the gears in the gear train 36. An output signal from the speed sensor circuit 34 is connected as a control signal to a controllable power supply 32 having a positive output terminal connected to the roller 10 and a negative, or ground, output terminal connected to the drive roller 9. The power supply 32 may be any suitable power supply having a controllable output voltage in accordance with the control signal applied thereto, such power supplies being well-known in the art.

MODE OF OPERATION

The operation of the recorder embodying the present invention is arranged to produce an image on the dry silver recording medium 2 by the self-developing of the recording medium 2 produced by the heat generated by the electrical current flow through the conductive, or carbon, backing thereof. Thus, the recorded image is applied to the recording medium 2 by the fiber optics 6 of the CRT 4. Subsequently, the recording medium 2 passes over the rollers 9 and 10 which are connected to the power supply 46 whereby the carbon backing of the recording medium 2 serves as an electrical conductor between the rollers 9 and 10. The double contact of the recording medium 2 on the drive roller 9 enables the developing process to be achieved on both sides of the roller 10 which is connected to the positive side of the power supply 46. The pinch roller 16 serves to urge the recording medium 2 into the second contact with the turnaround roller 10 to provide the second current path between the roller 10 and the drive roller 9. Thus, the length of the recording developing path is the sum of the two paths between the drive roller 9 and the roller 10. Accordingly, the distance between the drive roller 9 and the roller 10 is substantially shortened by the folded path provided for the recording medium 2.

In order to control the developing of the image on the recording medium 2, i.e., to provide a constant developing time, the speed of the recording medium 2 is monitored by monitoring the gear train 36 driving the drive roller 9. An output signal from the speed sensor 34 indicative of the speed of the recording medium 2 is applied to the power supply 32 to control its output voltage supplied to the rollers 9 and 10. Thus, the control of the voltage of the power supply 32 is used to neutralize any minor variations in the velocity of the recording medium 2 to maintain a desired developing time. It should be noted that while a single controlled speed embodiment has been shown, the apparatus of the present invention may be provided with a multi-speed motor drive and a speed sensor synchronized with a speed selection to provide a comparison with the selected speed. The output signal from the speed sensor would, thus, be used to control the developing time via the voltage control of the power supply 32 at the selected speed of the recording medium 2.

Accordingly, it may be seen that there has been provided, in accordance with the present invention, a recorder for a dry silver recorder medium.

The embodiments of the invention in which an exclusive property or privilege is claimed are defined as follows:

1. A recorder for an electrically conductive recording medium comprising
    a first electrically conductive roller arranged to support the recording medium at a first roller contact area,
    a second electrically conductive roller arranged to support the recording medium, said first roller being spaced from said second roller,
    a third roller arranged to urge the recording medium after passage of said medium over said second roller against said first roller on the side of said first roller opposite to said first roller contact area,
    a power supply means for providing an output potential across a pair of output terminals,
    first circuit means connecting one of said output terminals to said first roller,
    second circuit means connecting the other one of said output terminals to said second roller, said power supply means producing a current flow to the recording medium to produce a developing of a recording thereon,
    means for recording on the recording medium prior to its passage over said first roller on said first roller contact area, and
    recording medium drive means arranged to drive the recording medium past said means for recording and over said first, second and third rollers.

2. A recorder as set forth in claim 1 and further including speed monitoring means for sensing the speed of the recording medium passing across said first roller and having an output signal indicative of an error in the speed of the recording medium and wherein said power supply means includes control means responsive to an output signal from said speed monitoring means to vary the output potential between said output terminals of said power supply means in accordance therewith.

3. A recorder as set forth in claim 1 and further including an electrically insulating means for mounting said first and second rollers in said spaced apart relationship.

4. A recorder as set forth in 1 wherein said means for recording includes a CRT having a fiber optic face plate and pressure plate means for urging a recording medium against said fiber optic face plate, said CRT and said pressure plate being arranged to contact a recording medium prior to its passage over said first roller on said first roller contact area.

5. A recorder as set forth in claim 4 and including an electrically insulating means for mounting said first and second roller and said pressure plate means.

6. A recorder as set forth in claim 4 and including a motor means connected to said first roller to drive said first roller as a drive capstan for the recording medium.

7. A recorder for an electrically conductive recording medium comprising
    a first electrically conductive roller arranged to support the recording medium at a first roller contact area,
    a second electrically conductive roller arranged to support the recording medium, said first roller being spaced from said second roller, and
    a third roller arranged to urge the recording medium after passage of said medium over said second roller against said first roller on the side of said first roller opposite to said first roller contact area,
    a power supply means for providing an output potential across a pair of output terminals,
    first circuit means connecting one of said output terminals to said first roller,
    second circuit means connecting the other one of said output terminals to said second roller, said power supply means producing a current flow through the recording medium to produce a developing of a recording thereon,
    means for recording on the recording medium prior to its passage over said first roller on said first roller contact area, and
    motor drive means connected to said first roller to drive said first roller as a drive capstan for the recording medium.

8. A recorder as set forth in claim 7 wherein said power supply means includes potential control means responsive to a control signal for varying the output potential between said output terminals of said power supply means in accordance with said control signal and further including speed monitoring means for sensing the speed of the recording medium driven by said first roller and having an output signal indicative of an error in the speed of the recording medium and third circuit means for applying said output signal as said control signal to said potential control means whereby to vary said output potential to maintain a desired developing time of the recording medium.

9. A recorder as set forth in claim 7 and including an electrically insulating means for mounting said first and second rollers in said spaced apart relationship.

* * * * *